United States Patent [19]
Fults

[11] Patent Number: 5,730,225
[45] Date of Patent: Mar. 24, 1998

[54] POWER CULTIVATING DEVICE WITH BLADES ACTUATED WITH MIRRORED ACUATOR MOTION

[76] Inventor: Bobby J. Fults, 211 Patrick St., Estill Springs, Tenn. 37330

[21] Appl. No.: 583,951

[22] Filed: Jan. 11, 1996

[51] Int. Cl.⁶ .................................................. A01B 35/00
[52] U.S. Cl. .................. 172/36; 172/41; 172/54.5; 172/93; 172/95; 172/101
[58] Field of Search .................. 172/36, 41, 42, 172/53, 54, 54.5, 84, 85, 86, 88, 94, 93, 92, 95, 101, 110, 111; 30/228, 276; 56/16.7, 12.1, 12.7

[56] References Cited

U.S. PATENT DOCUMENTS

| | | | |
|---|---|---|---|
| 676,705 | 6/1901 | Stacy | 172/36 |
| 1,744,368 | 1/1930 | Derfler | 30/228 |
| 1,820,153 | 8/1931 | Pardue et al. | 172/36 X |
| 2,629,220 | 2/1953 | Grieder | 172/41 X |
| 2,731,721 | 1/1956 | Traurig | 30/228 |
| 2,911,716 | 11/1959 | Hopkins | 30/228 |
| 3,126,968 | 3/1964 | Booth | 30/228 X |
| 3,204,704 | 9/1965 | Goette | 172/42 X |
| 3,536,976 | 10/1970 | Briskman et al. | 30/228 X |
| 3,710,445 | 1/1973 | Roth | 30/228 X |
| 3,787,742 | 1/1974 | Murphy | 30/228 X |
| 4,069,583 | 1/1978 | Stubbings | 30/228 |
| 4,351,396 | 9/1982 | Moultron | 172/41 X |
| 4,421,176 | 12/1983 | Tuggle et al. | 172/41 |
| 4,483,070 | 11/1984 | Junkermann | |
| 4,501,332 | 2/1985 | Straayer | 172/41 |
| 4,541,492 | 9/1985 | Motruk | 172/41 |
| 4,648,464 | 3/1987 | Huxley | 172/36 |
| 4,756,084 | 7/1988 | Morita | |
| 5,031,395 | 7/1991 | Ohkandra et al. | 172/41 X |
| 5,404,644 | 4/1995 | Needham et al. | |
| 5,426,852 | 6/1995 | Macomber | |

FOREIGN PATENT DOCUMENTS

| | | | |
|---|---|---|---|
| 1178303 | 5/1959 | France | 172/41 |
| 823230 | 12/1951 | Germany | 172/36 |
| 1384223 | 3/1988 | U.S.S.R. | 172/41 |
| 945036 | 12/1963 | United Kingdom | 172/41 |

*Primary Examiner*—Terry Lee Melius
*Assistant Examiner*—Christopher J. Novosad
*Attorney, Agent, or Firm*—Waddey & Patterson; I. C. Waddey, Jr.

[57] ABSTRACT

A power cultivator including a power source, a shaft and a cultivating head having a pair of cultivating blades is described. The cultivating head includes an assembly that opens and closes the blades using a mirrored arcuate motion. The cultivating head itself is also part of the invention in that it can be attached to a standard string trimmer in place of the standard string trimming assembly. The power cultivator is effective at cultivating small areas of soil, in which a gardener usually uses a common goose-neck garden hoe.

15 Claims, 6 Drawing Sheets

POWER CULTIVATING DEVICE WITH BLADES ACTUATED WITH MIRRORED ACUATOR MOTION

BACKGROUND OF THE INVENTION

The present invention relates generally to a power cultivator and more particularly to a power cultivator that can cultivate soil within a small area, such as between two plants.

It will be appreciated by both novice and experienced gardeners that cultivating a small patch of soil, such as between two plants, is a difficult task. Typically, this task is accomplished by the use of the common goose-neck garden hoe. Cultivating between plants using the common garden hoe is time-consuming and laborious work that often takes the pleasure out of gardening. To this end, there have been several attempts to develop powered replacements for garden hoes.

One such attempt was disclosed in U.S. Pat. No. 5,426,582 issued to Macomber on Jun. 27, 1995. This patent discloses a power hoe attachment for a power gas trimmer which includes a blade member, a disk-shaped member and means for attaching the disk-shaped member to a power gas trimmer or the like. The disk-shaped member is rotatable about an axis extending through the center thereof so that the blade member rotates within the disk-shaped member. The blade member is rotated within the dirt to loosen soil.

Another such attempt is described in U.S. Pat. No. 4,501,322 issued to Straayer on Feb. 26, 1985. This patent discloses a hand carried portable weeder/cultivator apparatus wherein the string head of a conventional string weeder is replaced with a disk-shaped cultivator element. The cultivator element is attached to the rotatable shaft of the power head. The cultivator element cultivates the soil using a circular motion.

In summary, the Straayer '322 patent and the Macomber '852 patent disclose power hoe devices in which the cultivator elements work using circular motion. This type of circular motion does not cultivate the soil adequately.

What is needed, then, is a power cultivating device that can effectively cultivate a small area of soil, thus replacing the common garden hoe. This device is presently lacking in the prior art.

SUMMARY OF THE INVENTION

It is an object of this invention to provide a power cultivating device that effectively replaces the common garden hoe.

It is another object of this invention to provide a power cultivating device that can effectively cultivate a small area of soil.

It is yet another object of this invention to provide a power cultivating device that cultivates a small area of soil using blades that open and close.

It is still another object of this invention to provide power cultivating device wherein the blades are open and closed by an mirrored arcuate motion.

It is still a further object of this invention to provide a cultivating head attachment for a power string trimmer that accomplishes the foregoing objectives.

Accordingly, a power cultivator comprising a power source and a cultivating head, the cultivating head comprising at least one pair of blades, means for opening and closing the pair of blades, and means operatively connecting the power source to the means for opening and closing the pair of blades to drive the blades toward each other in one motion and away from each other in another motion is described. The power cultivator can further comprise a shaft mounted between the cultivating head and the power source and a guiding handle mounted in a medial position on the shaft relative to the cultivating head and the power source.

The power source can comprise an electric motor or a gasoline engine. The blades are preferably arcuate-shaped. The cultivating head can further comprise a housing, and the means for opening and closing the pair of blades is mounted within the housing.

The power cultivator can further include means for imparting arcuate motion to the blades.

The power output of the power source can be rotary; and in this case, the means for opening and closing the pair of blades includes means for converting the rotary power output to impart a pendulum motion to the blades.

The power source can also drive the blades in a motion whereby the movement of one blade of the pair of blades mirrors the movement of the other blade in the pair of blades.

In the power cultivator, the cultivating head can be oriented relative to the shaft such that the blades move in a side-to-side direction or such that the blades move in a forward and backward direction.

A cultivating head attachment for a power string trimmer having a power source and a power source output, the cultivating head attachment comprising means for attaching the cultivating head attachment to the power source output; a housing; at least one pair of blades extending downwardly from the housing; and means for controlling the movement of the at least one pair of blades when driven by said power source output to cause an opening and closing motion of the pair of blades is also described. The blades of this attachment are also preferably arcuate shaped.

DESCRIPTION OF THE PREFERRED EMBODIMENT

Figure 1A:
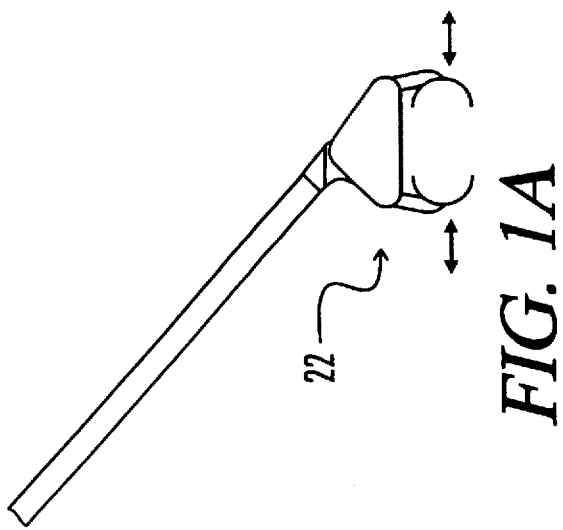
FIG. 1A is a side view of the power cultivator of the present invention wherein the cultivating head is oriented such that the blades of the cultivating head move in a forward and backward direction.

Referring now to the drawings, wherein like numerals represent like parts throughout, a preferred embodiment of the present invention, a power cultivator, is generally represented by the numeral 10. Referring specifically to FIG. 1, the power cultivator 10 has a gasoline engine 12 attached to the upper or distal end of a shaft 14. The gasoline engine 12 acts as a power source for the power cultivator 10. The lower or proximal end of shaft 14 is secured to cultivating head 22. A guiding handle 16 is attached on shaft 14 in a medial position relative to gasoline engine 12 and cultivating head 22. Indeed, gasoline engine 12, shaft 14 and guiding handle 16 are conventional features of a standard power string trimmer.

Although not shown in FIG. 1, it will be understood by one having ordinary skill in the art and is well known in the art that a flexible drive shaft 20 runs within shaft 14 from gasoline engine 12 to cultivating head 22. It will also be understood by one having ordinary skill in the art that gasoline engine 12 includes a throttle trigger or the like that can be used to regulate the speed at which flexible drive shaft 20 runs.

Figure 3:
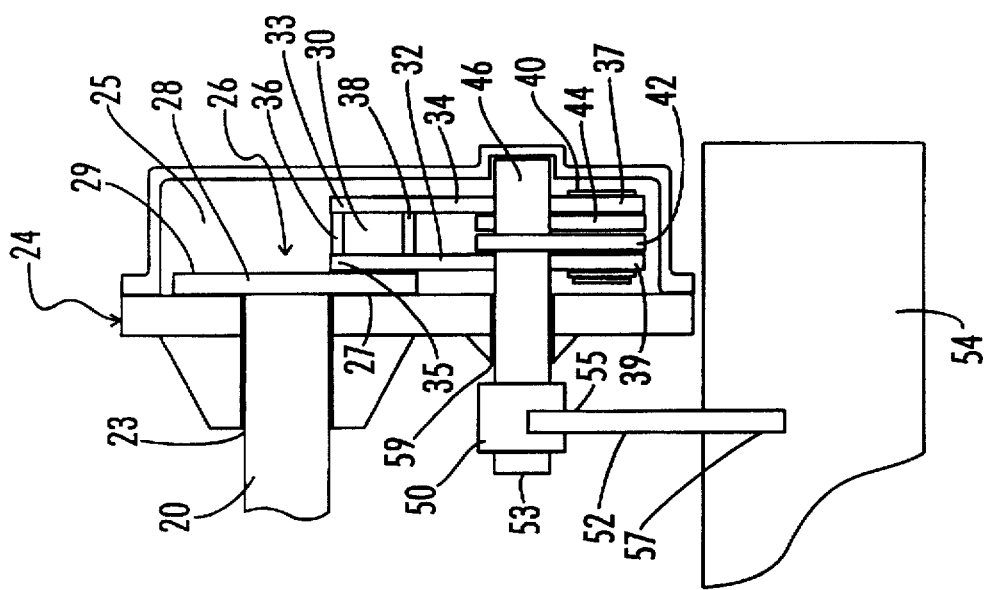
FIG. 3 is a side internal view of the cultivating head of the present invention.
Figure 2:
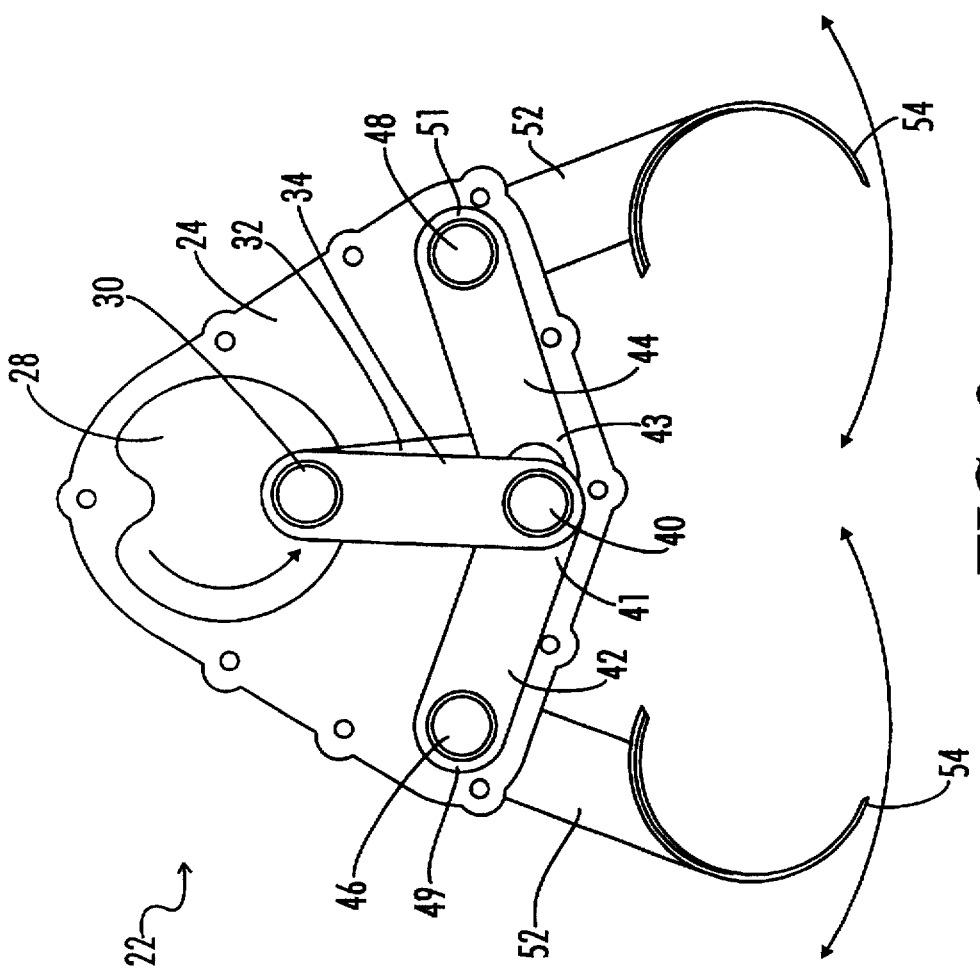
FIG. 2 is a front internal view of the cultivating head of the present invention.

Referring now to FIGS. 2 and 3, the cultivating head 22 is described in more detail. Cultivating head 22 includes a two-piece housing 24. Flexible drive shaft 20 passes through opening 23 in housing 24 and is attached to driver means 26. In the embodiment of the invention described in FIGS. 2 and 3, driver means 26 comprises rotating disk 28 and a rod 30. Flexible drive shaft 20 is connected to one side 27 of rotating disk 28 and rod 30 is connected to the opposite side 29 of rotating disk 28 and extends away from rotating disk 28 into the cavity 25 defined by housing 24. Rod 30 is mounted near the periphery of rotating disk 28.

Continuing on in FIGS. 2 and 3, rod 30 passes through bores in the upper or proximal ends 33 and 35 of driver arms 32 and 34. Driver arms 32 and 34 are separated by separating pins 36 and 38. The lower or distal ends 37 and 39 of driver arms 32 and 34 are connected to rod 40 in that rod 40 passes through bores in the lower or distal ends 37 and 39 of driver arms 32 and 34. Rod 40 also passes through bores in the inner or proximal ends 41 and 43 of rocker arms 42 and 44.

Shafts 46 and 48 pass through the bores in the outer or distal ends 49 and 51 of rocker arms 42 and 44, respectively. As best seen in FIG. 3, shaft 46 proceeds through opening 59 in housing 24 to the exterior of housing 24. Mounting ring 50 is fixedly attached to the end 53 of shaft 46 that extends outside of housing 24. Blade support 52 is attached to mounting ring 50 and extends vertically downward therefrom. One of the pair of arcuate-shaped blades 54 is attached to blade support 52 at the end 57 of blade support 52 opposite the end 55 that is attached to mounting ring 50. The other blade 54 of the pair of blades is similarly connected to shaft 48.

Blades 54 are opened and closed by the assembly described above as follows. Drive shaft 20 turns rotating disk 28 thus rotating rod 30 around the periphery of rotating disk 28. As rod 30 is rotated, it pulls driver arms 32 and 34 upwards relative to the top of housing 24, which in turn pull rocker arms 42 and 44 upwards relative to the top of housing 24. As rocker arms 42 and 44 are pulled upward, blades 54 are closed. As rotating disk 28 completes its revolution, rod 30 moves driver arms 32 and 34 downward, which in turn propels rocker arms 42 and 44 downward. This downward motion opens blades 54. Rods 30 and 40 and shafts 46 and 48 facilitate the movement by allowing rotation of driver arms 32 ad 34 and rocker arms 42 and 44 at their connections. Thus, the blades 54 are opened and closed through a mirroring arcuate motion.

Figure 1:
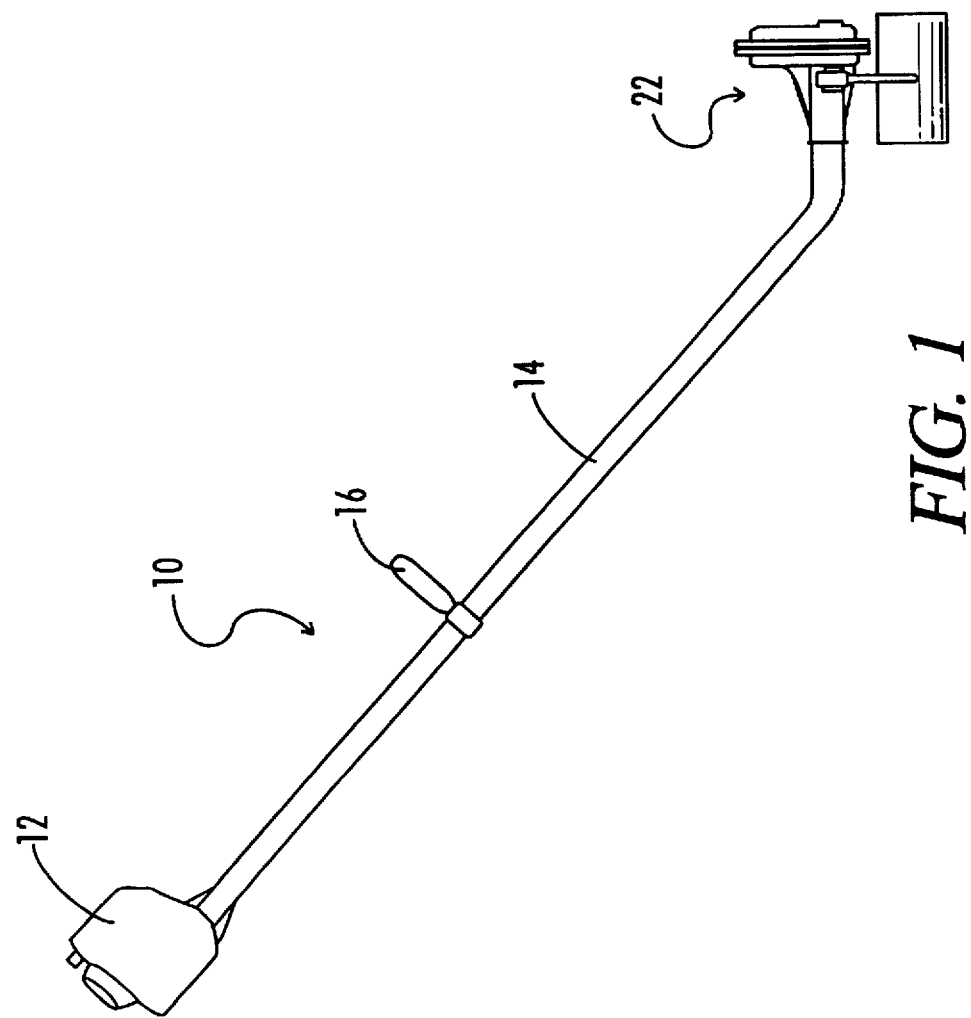
FIG. 1 is a side view of the power cultivator of the present invention wherein the cultivating head is oriented such that the blades of the cultivating head move in a side to side direction.

Referring now to FIG. 1A, an alternative orientation of the cultivating head 22 is depicted. In FIG. 1A, cultivating head 22 is oriented such that blades 54 open and close in a forward and backward direction relative to the cultivating head 22, as opposed to the side-to-side direction of the blades 54 when cultivating head 22 is oriented as in FIG. 1. In this embodiment, blades 54 are also opened and closed through the mirroring arcuate motion described above.

Figure 4:
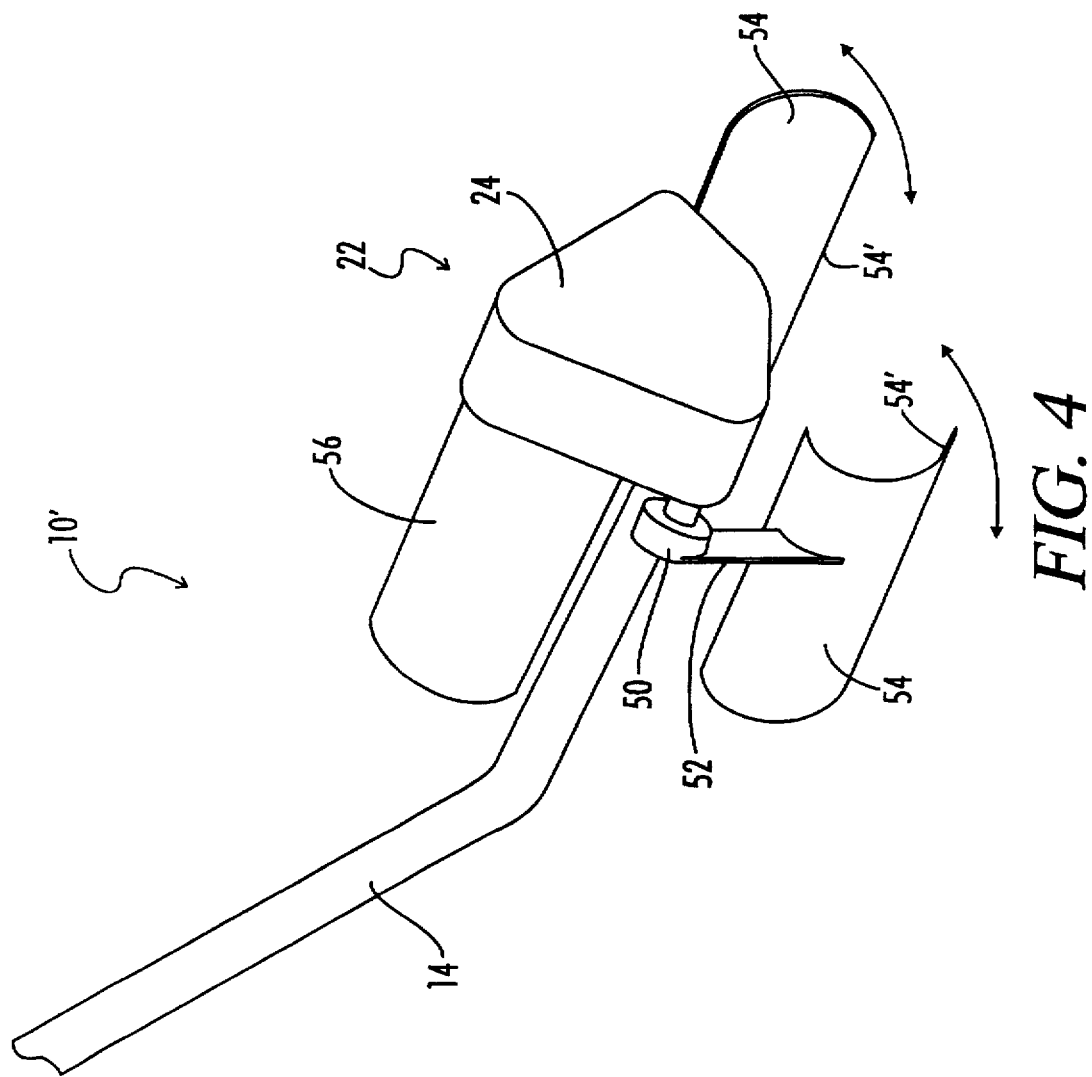
FIG. 4 is a perspective view of an alternative embodiment of the power cultivator of the present invention.
Figure 5:
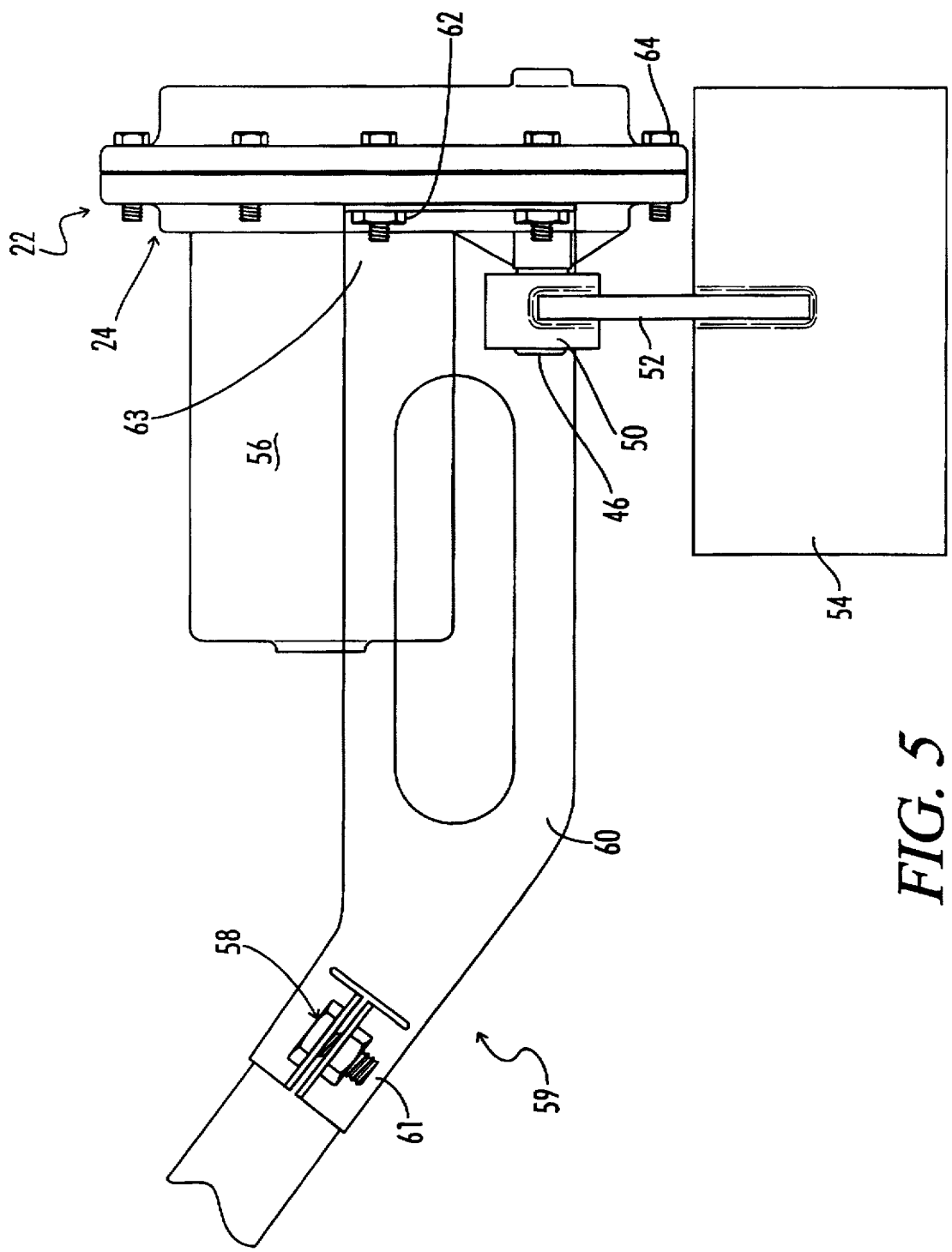
FIG. 5 is a side view of an alternative embodiment of the power cultivator of the present invention.

Referring now to FIGS. 4 and 5, an alternative embodiment 10' of the power cultivator is described. As can be seen from FIG. 4, the blades 54 are arcuate throughout their entire width. As can be further seen from FIG. 4, each blade has a cultivating edge 54' and each cultivating edge has a predetermined length and profile (the illustrated predetermined profile being a straight-edge). As can also be seen from the various figures of the drawings, the cultivating edges 54' of the blades 54 are aligned or oriented relative to each other in a predetermined manner (in a parallel relationship as illustrated), and that orientation remains constant throughout the range of motion of the blades 54 during the cultivating process. In this embodiment, the power source is an electric motor 56. It will be understood by one having ordinary skill in the art that alternative embodiment 10' includes means to regulate the speed at which electric motor 56 operates. In FIG. 5, attaching means 59 for attaching cultivating head 22 to shaft 14 is illustrated. The attaching means include clamp 58 and extension 60. A first or proximal end 61 of extension 60 is attached to shaft 14 using clamp 58. The second or distal end 63 of extension 60 is attached to housing 24 of cultivating head 22 using bolts 62 or other means that would be apparent to one having ordinary skill in the art. As best seen in FIG. 5, the two pieces of housing 24 are also secured together using bolts 64 or other means that would be apparent to one having ordinary skill in the art.

In the two embodiments described above, the blades 54 are rigidly mounted to blade support 52 and mounting ring 50. Optionally, a sheer pin, coil spring or the like can be mounted between blade support 52 and mounting ring 50. The coil spring or sheer pin will provide relief from occasional binding which may occur if a rock or other form of debris is entrapped between the blades 54.

Optionally, a counter weight can be added to cultivating head 22 in a position where the counter weight will generate a bouncing motion when cultivating head 22 is operated. This option can be added to the invention when a bouncing motion is needed to improve the cultivating abilities of the invention.

Preferably, the power source, such as gasoline engine 12 or electric motor 56, that drives the cultivating head 22 is sufficiently powerful to close the blades 54 in 1/500 of a minute. In other words, if one stroke is defined as the closing of blades 54, the power source is powerful enough to drive the blades at 500 strokes per minute.

Figure 6:
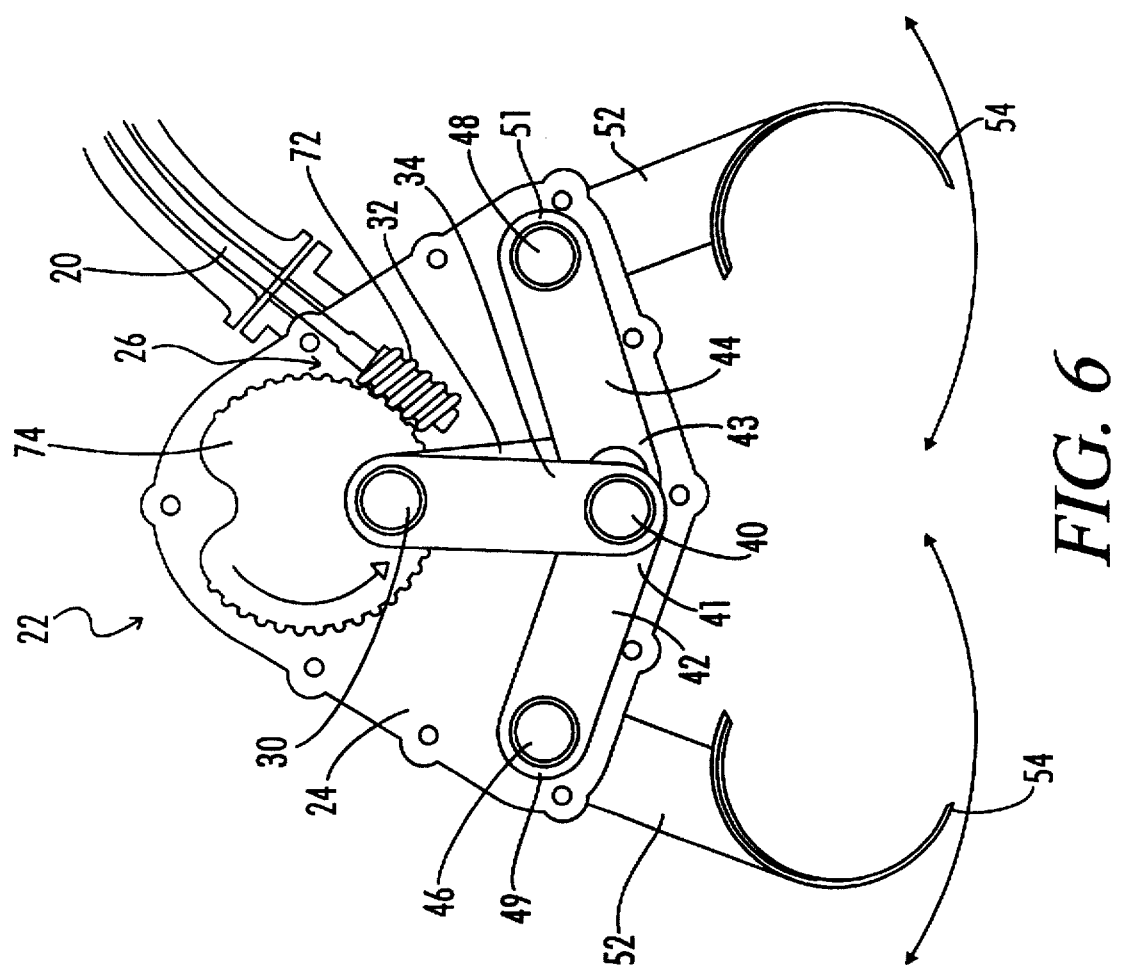
FIG. 6 is a front internal schematic view of the cultivating head of the present invention including a worm gear assembly as a driver means.

Referring now to FIG. 6, an alternative embodiment of driver means 26 which includes a combination of a worm 72 and worm gear 74 is depicted. The drive shaft 20 is operatively connected to a worm 72. Worm 72 rotates worm gear 74. Worm gear 74 is attached to rod 30, and rod 30 interacts with driver arms 32 and 34 so as to drive blades 54 substantially as described above. Using worm 72 and worm gear 74, the final reduction ratio between the power source, here a gasoline engine 12 as shown in FIG. 1, and the cultivating head 22 produces a speed of 0–500 strokes per minute for the power cultivator 10.

Figure 9:
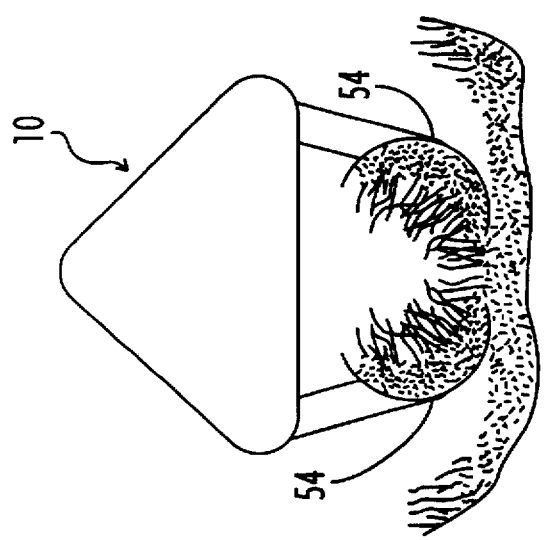
FIG. 9 depicts the use the power cultivator of this invention in cultivation, wherein the blades of the power cultivator of this invention are in a closed position.
Figure 8:
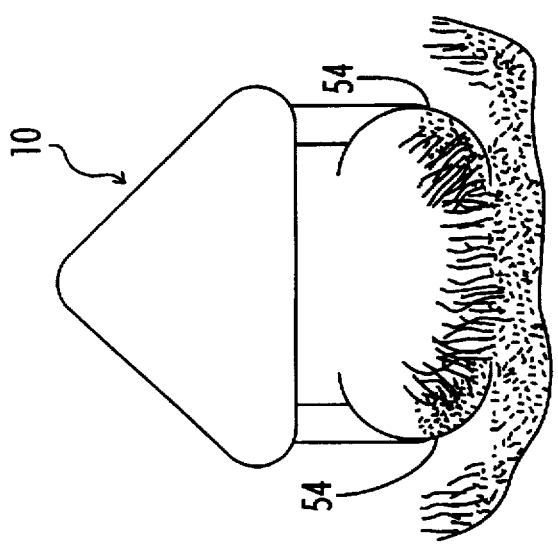
FIG. 8 depicts the use of the power cultivator of the present invention in cultivation, wherein the blades of the power cultivator are at a position between open and closed.
Figure 7:
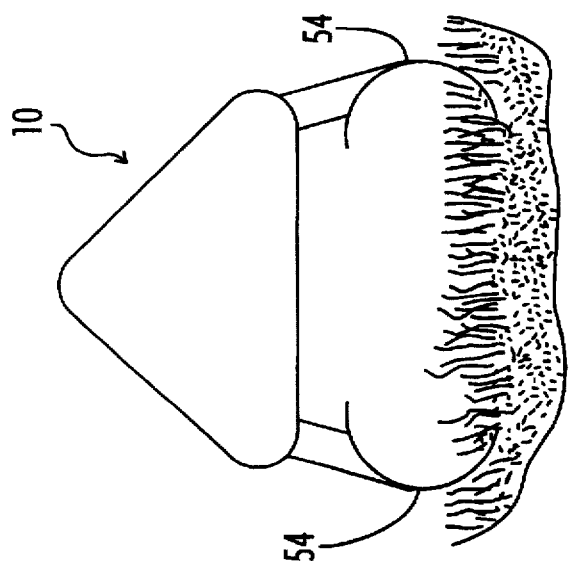
FIG. 7 depicts the use of the power cultivator of the present invention in cultivation, wherein the blades of the power cultivator are in an open position.

Referring now to FIGS. 7–9, cultivation using power cultivator 10 is described. As the blades 54 of the cultivator 10 begin to close, the cultivating process takes place. Due to the weight of the apparatus and the arcuate shape of the blades, the closing action forces the cultivator 10 to dig deeper through most of the closing cycle. The depth of cultivation can be manipulated by the user by varying the amount of time the machine is allowed to remain stationary, and by varying the speed at which it is operating. To move the power cultivator 10 laterally, the user simply tilts it slightly in the direction he/she wants to go.

Although there have been described particular embodiments of the present invention of a new and useful power cultivator, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A hand held power cultivator comprising a power source and a cultivating head, the cultivating head comprising at least one pair of blades, said blades each having an elongated cultivating edge each cultivating edge having a predetermined length and profile adapted for cultivating, means for opening and closing the at least one pair of blades in a mirror image motion, and means operatively connecting the power source to the means for opening and closing the at least one pair of blades to drive the blades to move simultaneously toward each other in one motion and to move simultaneously away from each other in another motion; with the entire length of each predetermined profile moving laterally relative to the entire length of the other predetermined profile as said blades move toward and away from each other; and where, during use, only the blades engage the material being cultivated.

2. The power cultivator according to claim 1 wherein the power source comprises an electric motor.

3. The power cultivator according to claim 1 wherein the power source comprises a gasoline engine.

4. The power cultivator according to claim 1 wherein the blades are arcuate-shaped for their entire width.

5. The power cultivator according to claim 1 wherein the cultivating head further comprises a housing and the means for opening and closing the at least one pair of blades is mounted within the housing.

6. The power cultivator according to claim 1 further including means for imparting arcuate motion to the blades.

7. The power cultivator according to claim 1 wherein a power output of the power source is rotary and the means for opening and closing the at least one pair of blades includes means for converting the rotary power output to impart a pendulum motion to the blades.

8. The power cultivator according to claim 1 wherein the power source drives the blades in a motion whereby the movement of one blade of the at least one pair of blades mirrors the movement of the other blade in the at least one pair of blades.

9. A power cultivator comprising a power source and a cultivating head, the cultivating head comprising at least one pair of blades, said blades adopted for cultivation means for opening and closing the at least one pair of blades, in a mirror image motion and means operatively connecting the power source to the means for opening and closing the at least one pair of blades to drive the blades toward each other in one motion and away from each other in another motion; said power cultivator further comprising a shaft mounted between the cultivating head and the power source and a guiding handle mounted in a medial position on the shaft relative to the cultivating head and the power source.

10. The power cultivator according to claim 2 wherein the cultivating head is oriented relative to the shaft such that the blades move in a side-to-side direction.

11. The power cultivator according to claim 2 wherein the cultivating head is oriented relative to the shaft such that the blades move in a forward and backward direction.

12. The cultivating head attachment according to claim 11 wherein the blades are arcuate shaped for an entire width of the blades.

13. In combination, a cultivating head attachment and a power string trimmer having a power source and a power source output, the cultivating head attachment comprising means for attaching the cultivating head attachment to the power source output; a housing; at least one pair of blades extending downwardly from the housing, said blades each having a cultivating edge adapted for cultivating; and means for controlling the movement of the at least one pair of blades when driven by said power source output to cause a mirror image opening and closing motion of the blades of the at least one pair of blades; wherein each edge of the at least one pair of blades is oriented relative to the edge of the other blade of the at least one pair of blades and the orientation of the edges relative to each other is constant throughout the opening and closing motion of the blades; and where, during use, the cultivator is supported only by the user and the blades engaging the material being cultivated.

14. A hand held power cultivator comprising a power source and a cultivating head, the cultivating head comprising a pair of substantially arcuate blades having soil tilling edges, means for opening and closing the pair of blades in a mirror image arcuate motion, and means operatively connecting the power source to the means for opening and closing the pair of blades to drive the blades toward each other and away from each other in the mirror image arcuate motion; wherein each edge of the at least one pair of blades is oriented relative to the edge of the other blade of the at least one pair of blades and the orientation of the edges relative to each other is substantially constant throughout the opening and closing motion of the blades; and where, during use, the cultivator is supported only by the user and the blades engaging the soil being tilled.

15. The power cultivator according to claim 14 wherein the substantially arcuate blades are arcuate in shape for their entire width such that each blade defines a scoop.

* * * * *